United States Patent [19]

Maier et al.

[11] Patent Number: 5,625,815

[45] Date of Patent: Apr. 29, 1997

[54] RELATIONAL DATABASE SYSTEM AND METHOD WITH HIGH DATA AVAILABILITY DURING TABLE DATA RESTRUCTURING

[75] Inventors: Donald S. Maier, Campbell; Roberta S. Marton, Fremont; James H. Troisi, Sunnyvale, all of Calif.; Pedro Celis, Austin, Tex.

[73] Assignee: Tandem Computers, Incorporated, Cupertino, Calif.

[21] Appl. No.: 629,000

[22] Filed: Apr. 12, 1996

Related U.S. Application Data

[63] Continuation of Ser. No. 377,758, Jan. 23, 1995, abandoned.
[51] Int. Cl.$^6$ ............................................. G06F 17/30
[52] U.S. Cl. ............................ 395/608; 364/DIG. 1; 364/282.1
[58] Field of Search ............................ 395/600, 608

[56] References Cited

U.S. PATENT DOCUMENTS

| | | | |
|---|---|---|---|
| 4,853,843 | 8/1989 | Ecklund | 395/600 |
| 5,333,303 | 7/1994 | Mohan | 395/575 |
| 5,404,508 | 4/1995 | Konrad et al. | 395/600 |
| 5,475,837 | 12/1995 | Ishak et al. | 395/600 |

FOREIGN PATENT DOCUMENTS

| | | |
|---|---|---|
| 306197A3 | 3/1989 | European Pat. Off. . |
| 560543A2 | 9/1993 | European Pat. Off. . |

OTHER PUBLICATIONS

"Algorithms for Creating Indexes for Very Large Tables Without Quiescing Updates"; C. Mohan et al.; Computer Science, RJ8016 (73664); Mar. 15, 1991; 20 pages.

"Performance of On–Line Index Construction Algorithms"; V. Srinivasan et al.; Computer Sciences Technical Report #1047; Computer Sciences Dept, Univ of Wisconsin, Madison; Sep. 1991; 25 pages.

"On–Line Index Construction Algorithms"; V. Srinivasan et al.; Proceedings of the High Performance Transaction Systems Workshop; Sep. 1991.

May 23, 1996, EPC Search Report.

Leslie, Harry, "Optimizing Parallel Query Plans and Execution", Intellectual Leverage, San Francisco, Feb. 25–Mar. 1, 1991, No. Conf. 36, 25 Feb. 1991, IEEE, pp. 105–109.

*Primary Examiner*—Wayne Amsbury
*Attorney, Agent, or Firm*—Flehr Hohbach Test Albritton & Herbert LLP

[57] ABSTRACT

A database computer system includes memory, residing in a plurality of interconnected computer nodes, for storing database tables. Each database table has a plurality of columns, a primary key index based on a specified subset of the columns, and an associated table schema. At least a subset of the database tables are partitioned into a plurality of partitions, each partition storing records having primary key values in a primary key range distinct from the other partitions. A transaction manager generates and stores an audit trail, each audit entry denoting a database table record event, such as an addition, deletion or alteration of a specified database table record in a specified one of said database tables. Four online data definition procedures allow the structure of a database table to be altered while the database table remains available to execution of transactions, with minimal impact of the availability of the database table for transaction execution. The four online data definition procedures are a move partition procedure, a split partition procedure, a move partition boundary procedure, and a create new index procedure. Each of these online procedures has three or four phases of execution. In a first phase, records of a table partition or the entire table are accessed using read only access, so as to generate a new partition, move records between two partitions, or to create a new index. In a second phase, audit trail entries are used to clean up the data structures created during the first phase. In a third phase, access to the database table is briefly locked while audit trail entries created after the second phase are used to make final changes to the data structures created during the first phase, and while the database table schema is updated to reflect the changes to the database table produced.

12 Claims, 12 Drawing Sheets

Command: MovePartition(PartitionID, NewDiskLocation)

Phase 1: "Dirty Copy" — 220

Create file for NewPartition.
Create file label for NewPartition.
Save position of last record in Audit Trail as AuditPtr.

While allowing user transactions to continue accessing the specified OldPartition, copy all records of the OldPartition into the NewPartition without regard to the fact that records in the OldPartition may be in the process of being changed.

Phase 2: "Partial Cleanup" — 222

Set Filter for AuditTrail to access only audit trail records that pertain to the OldPartition.

Starting with the audit record in the Audit Trail at the initial AuditPtr value, repeat the following steps for each sequential audit record that passes the Filter until the end of the Audit Trail is reached:

Modify the audit record to refer to the NewPartition.
    If the change to the table noted in the audit record is already reflected in the copied records.
        Ignore the audit record
    Otherwise
        Perform a "redo" with respect to the modified audit record so as to apply the change noted in the audit record to the NewPartition. This includes updating the B-tree for the NewPartition as needed to perform the change.

FIGURE 4A

| FIGURE 4A |
|-----------|
| FIGURE 4B |

FIGURE 4

Phase 3: "Final Cleanup"

Request and wait for lock on the OldPartition.
As a unitary transaction:
   Repeat the following steps for each sequential audit record that passes the Filter until the last such audit record has been processed:
      Modify the audit record to refer to the NewPartition.
      If the change to the table noted in the audit record is already reflected in the copied records.
         Ignore the audit record
      Otherwise
         Perform a "redo" with respect to the modified audit record so as to apply the change noted in the audit record to the NewPartition. This includes updating the B-tree for the NewPartition as needed to perform the change.

Request and wait for lock on the Base Table.
   Delete Catalog entry for OldPartition
   Create Catalog entry for NewPartition
   Update catalog entries and file labels for all other partitions of the Base Table.
   Release Lock on BaseTable.
   In Background, delete OldPartition and release disk space used by OldPartition file
Conclude transaction.

FIGURE 4B

Command: SplitPartition(OldPartition, OldRange, NewRange1, NewRange2, NewPartition)

Phase 1: "Dirty Copy" — 230

Create file for NewPartition.
Create file label for NewPartition.
Save position of last record in Audit Trail as AuditPtr.

While allowing user transactions to continue accessing the specified OldPartition, copy all records of the OldPartition having a Primary Key value in NewRange2 into the NewPartition without regard to the fact that records in the OldPartition may be in the process of being changed.

Phase 2: "Partial Cleanup" — 232

Set Filter for AuditTrail to access only audit trail records that pertain to OldPartition records with a Primary key value in NewRange2.

Starting with the audit record in the Audit Trail at the initial AuditPtr value, repeat the following steps for each sequential audit record that passes the Filter until the end of the Audit Trail is reached:

Modify the audit record to refer to the NewPartition.
    If the change to the table noted in the audit record is already reflected in the copied records.
        Ignore the modified audit record
    Otherwise
        Perform a "redo" with respect to the modified audit record so as to apply the change noted in the audit record to the NewPartition. This includes updating the B-tree for the NewPartition as needed to perform the change.

FIGURE 5A

Phase 3: "Final Cleanup"

Request and wait for lock on the OldPartition.
As a unitary transaction:

Read each audit record in the Audit Trail that references the OldPartition and repeat the following steps for each sequential audit record that passes the Filter until the last such audit record has been processed:

Modify the audit record to refer to the NewPartition. If the change to the table noted in the audit record is already reflected in the copied records.
            Ignore the audit record
        Otherwise
             Perform a "redo" with respect to the modified audit record so as to apply the change noted in the audit record to the NewPartition. This includes updating the B-tree for the NewPartition as needed to perform the change.

Split B-tree for OldPartition into two parts, one for records in NewRange1 and one for records in NewRange2.
    Make NewRange2 in OldPartion inaccessible.
    Request and wait for lock on the Base Table.
    Delete Catalog entry for OldPartition
    Create Catalog entry for NewPartition
    Update catalog entries and file labels for all other partitions of the Base Table.
    Release Lock on BaseTable.
Conclude transaction.

In Background, delete all records in OldPartition referenced by B-tree for records in NewRange2

FIGURE 5B

| FIGURE 5A |
| FIGURE 5B |

FIGURE 5

Command: MovePartitionBoundary(Partition1, OldRange1, NewRange1, Partition2, OldRange2, NewRange2)

Phase 1: "Dirty Copy" ⟋240

Save position of last record in Audit Trail as AuditPtr.
MoveRange = range of Primary Key values in NewRange2 that are not in OldRange2.

While allowing user transactions to continue accessing the specified Partition1, copy all records of Partition1 having a Primary Key value in the MoveRange into Partition2 without regard to the fact that records in Partition1 may be in the process of being changed.

Phase 2: "Partial Cleanup" ⟋242

Set Filter for AuditTrail to access only audit trail records that pertain to the Partition1 records with a Primary key value in MoveRange.

Starting with the audit record in the Audit Trail at the initial AuditPtr value, repeat the following steps for each sequential audit record that passes the Filter until the end of the Audit Trail is reached:
    Modify the audit record to refer to Partition2.
    If the change to the table noted in the audit record
    is already reflected in the copied records.
        Ignore the modified audit record
    Otherwise
        Perform a "redo" with respect to the modified audit record so as to apply the change noted in the audit record to Partition2. This includes updating the B-tree for Partition2 as needed to perform the change.

FIGURE 6A

Phase 3: "Final Cleanup"

Request and wait for lock on the OldPartition.
As a unitary transaction:
    Read each audit record in the Audit Trail and repeat the following steps for each sequential audit record that passes the Filter until the last such audit record has been processed:
        Modify the audit record to refer to the Partition2.
        If the change to the table noted in the audit record is already reflected in the copied records.
            Ignore the audit record
        Otherwise
            Perform a "redo" with respect to the modified audit record so as to apply the change noted in the audit record to the Partition2. This includes updating the B-tree for Partition2 as needed to perform the change.
    Split B-tree for Partition1 into two parts, one for records in NewRange1 and one for records in MoveRange.
    Make MoveRange in Partition1 inaccessible.
    Request and wait for lock on the Base Table.
    Update catalog entries and file labels for Partition1 and Partition2.
    Update catalog entries and file labels for all other partitions of the Base Table.
    Release Lock on BaseTable.
Conclude transaction.

In Background, delete all records in Partition1 referenced by B-tree for records in MoveRange

FIGURE 6B

| FIGURE 6A |
|-----------|
| FIGURE 6B |

FIGURE 6

Command: CreateIndex(BaseTable, AltKeyColumns,
UniqueIndexFlag, NewIndex)

250

Phase 1: "Dirty Copy"

Save position of last record in Audit Trail as AuditPtr.

While allowing user transactions to continue accessing the specified
BaseTable, create NewIndex record for each record in the BaseTable:

| Create NewIndex Record | 251 |
|---|---|

AltKey1 = Create_AltKey(Record, AltKeyColumns)
PrimaryKey1 = Create_PrimaryKey(Record, PrimarytKeyColumns)
If UniqueIndexFlag
   Prior to storing each NewIndex record, check to see if NewIndex
   already has a record with an alternate index value of AltKey1.
   If one is found
      Check to see if (A) the record still has index values of
      AltKey1 and PrimaryKey1, and (B) if there is another record
      in the BaseTable having an alternate key value of AltKey1.
      If both A and B are true
         Abort CreateIndex - conflicting database records found
      Else
         Store new index record in NewIndex
   Else
      Store new index record in NewIndex
Else /* UniqueIndexFlag = False */
   Store new index record in NewIndex

FIGURE 7A

| FIGURE 7A |
|---|
| FIGURE 7B |
| FIGURE 7C |

FIGURE 7

252

Phase 2: "Partial Cleanup"

Set Filter for AuditTrail to access only audit trail records that pertain to the BaseTable.

Starting with the audit record in the Audit Trail at the initial AuditPtr value, repeat the following steps for each sequential audit record that passes the Filter until the end of the Audit Trail is reached:
    Call Audit Fixup Procedure for Create Index

253

Audit Fixup Procedure for Create Index

If the audit record denotes a change to a base table record that does not alter either the Primary Key or the AltKey of the record, or is already reflected in the NewIndex
    Ignore the audit record
Elseif the audit record denotes deletion of a base table record
    Create an Audit Record denoting deletion of associated NewIndex record, if one exists
Elseif the audit record denotes addition of a base table record
    Create an Audit Record denoting creation of NewIndex Record (using same procedure as in Phase 1)
Else /* audit record denotes alteration of a base table record */
    Create an Audit Record denoting deletion of the NewIndex record, if one exists, for altered record's prior alternate key value
    Create an Audit Record denoting creation of a NewIndex Record for altered record Perform a "redo" of the created audit record(s) so as to apply changes to the index that are needed for the change to the BaseTable, as recorded by the audit record. Update the B-tree for the index as needed to perform the changes.

FIGURE 7B

RELATIONAL DATABASE SYSTEM AND METHOD WITH HIGH DATA AVAILABILITY DURING TABLE DATA RESTRUCTURING

This application is a continuation of patent application Ser. No. 08/377,758, filed Jan. 23, 1995, now abandoned.

The present invention relates generally to database management systems, and particularly to a database management system in which database table availability is maintained, with minimal or no user availability outages during table restructuring operations such as splitting a table or index partition, moving an existing table or index partition, creating a new index and moving a table or index partition boundary.

BACKGROUND OF THE INVENTION

Database configuration and reconfiguration operations can have a significant effect on the availability of user applications that need access to databases undergoing structural changes. The Tandem™ NonStop™ SQL/MP relational database management system (DBMS), prior to the present invention, allowed read access, but not write access, to the portions of the database table undergoing the restructuring operation.

Although most users perform these operations infrequently, their duration can account for thousands of minutes of application outages per year. A discussion of the cost of application outages appears in the article "An Overview of NonStop SQL/MP," Ho et al., Tandem Systems Review, Jul. 1994.

The present invention eliminates most of the downtime associated with four database reconfiguration operations: Move Partition, Split Partition, Move Partition Boundary, and Create Index. The Move Partition procedure moves a partition that resides on one disk to another disk. The Split Partition procedure splits one partition into two. The Move Partition Boundary procedure moves rows of a base table between adjacent partitions, typically shifting rows from a large partition to a less large partition. The Create Index procedure creates an efficient alternate access path to a database table by ordering data according to the value specified in the key columns. The Create Unique Index variant of this procedure ensures that there is exactly one alternate access path to each record in the database table.

The implementation of these procedures in the present invention substantially reduces, but does not eliminate, associated outages. Even with the present invention, user database activity continues to be restricted for about one minute or less per database restructuring operation. The outage time varies depending on the number of user transactions running against the table being restructured, the size of those transactions, and the number of partitions in the affected table.

It is therefore a primary object of the present invention to enable substantially improved user transaction access to a database table while the table is undergoing a structural change operation.

Another object of the present invention is to enable Move Partition, Split Partition, Move Partition Boundary, and Create Index operations to be performed on a database table while enabling user transactions to continue to be performed on the table, except during a short final phase of those operations.

Another object of the present invention is to avoid the use of "side files" for the above mentioned database reconfiguration operations, so as to reduce the overhead disk space requirements associated with these operations to almost zero.

Another object of the present invention is to implement the above mentioned database reconfiguration operations using procedures that directly read from the transaction audit log, thereby making these database reconfiguration operations similar to a database recovery process.

Another object of the present invention is to implement the database reconfiguration operations using well established, optimized, database recovery process procedures thereby making the database reconfiguration operations efficient in terms of computation time and in terms of the computer resources used.

Yet another object of the present invention is to utilize substantially similar database reconfiguration procedures for four distinct database reconfiguration operations, thereby improving the reliability of those procedures and simplifying maintenance of and updates to those procedures.

SUMMARY OF THE INVENTION

In summary, the present invention is a set of procedures for modifying the structure of a database table or index "online," while the database table or index remains available for execution of transactions, with minimal impact on the availability of the database table for transaction execution.

The present invention operates in a database computer system having memory, residing in a plurality of interconnected computer nodes, for storing database tables. Each database table or index has a plurality of columns, a primary key index based on a specified subset of the columns, and an associated table schema. In most implementations, at least some of the database tables or indexes are partitioned into a plurality of partitions, each partition storing records having primary key values in a primary key range distinct from the other partitions.

A transaction manager generates and stores an audit trail, each audit entry denoting a database table or index record event, such as an addition, deletion or alteration of a specified database table or index record in a specified one of the database tables or indexes.

Four online data definition procedures allow the structure of a database table or index to be altered while the database table or index remains available for execution of transactions, with minimal impact of the availability of the database table or index for transaction execution. The four online data definition procedures are a Move Partition procedure, a Split Partition procedure, a Move Partition Boundary procedure, and a Create Index procedure. Each of these online procedures has several phases of execution. In a first phase, the definitions of existing objects are read and any new objects that are needed to perform the requested procedure are created. Then, records of a table or index partition or the entire table are accessed, using "browse" access, so as to generate a new partition, to move records between two partitions, or to create a new index. Browse access is a form of read access that allows database records to be read through any record locks that may be in place. Thus, browse access will sometimes result in the reading of records that are in the midst of being modified.

In a second phase, audit trail entries are accessed and the equivalent database table or index operations denoted in those audit trail entries are redone on the target objects, whenever necessary, to bring the data records created during the first phase up-to-date. In a third phase, access to the database table is briefly locked (A) while audit trail entries created after the second phase are used to make final changes to the previously created data records, and then (B) while the database table or index schema is updated to reflect the changes to the database table or index produced.

If a fourth phase, used by the Move Partition Boundary and Split Partition procedures, records in a database partition that are inconsistent with the modified database table schema are deleted as a background operation while use of the database table by transactions resumes.

BRIEF DESCRIPTION OF THE DRAWINGS

Additional objects and features of the invention will be more readily apparent from the following detailed description and appended claims when taken in conjunction with the drawings, in which:

FIG. 4, comprising FIGS. 4A and 4B, is a flowchart of the Move Partition procedure used in a preferred embodiment of the present invention.

FIG. 5, comprising FIGS. 5A and 5B, is a flowchart of the Split Partition procedure used in a preferred embodiment of the present invention.

FIG. 6, comprising FIGS. 6A and 6B, is a flowchart of the Move Partition Boundary procedure used in a preferred embodiment of the present invention.

FIG. 7, comprising FIGS. 7A, 7B, and 7C is a flowchart of the Create Index procedure used in a preferred embodiment of the present invention.

DESCRIPTION OF THE PREFERRED EMBODIMENTS

Figure 1:
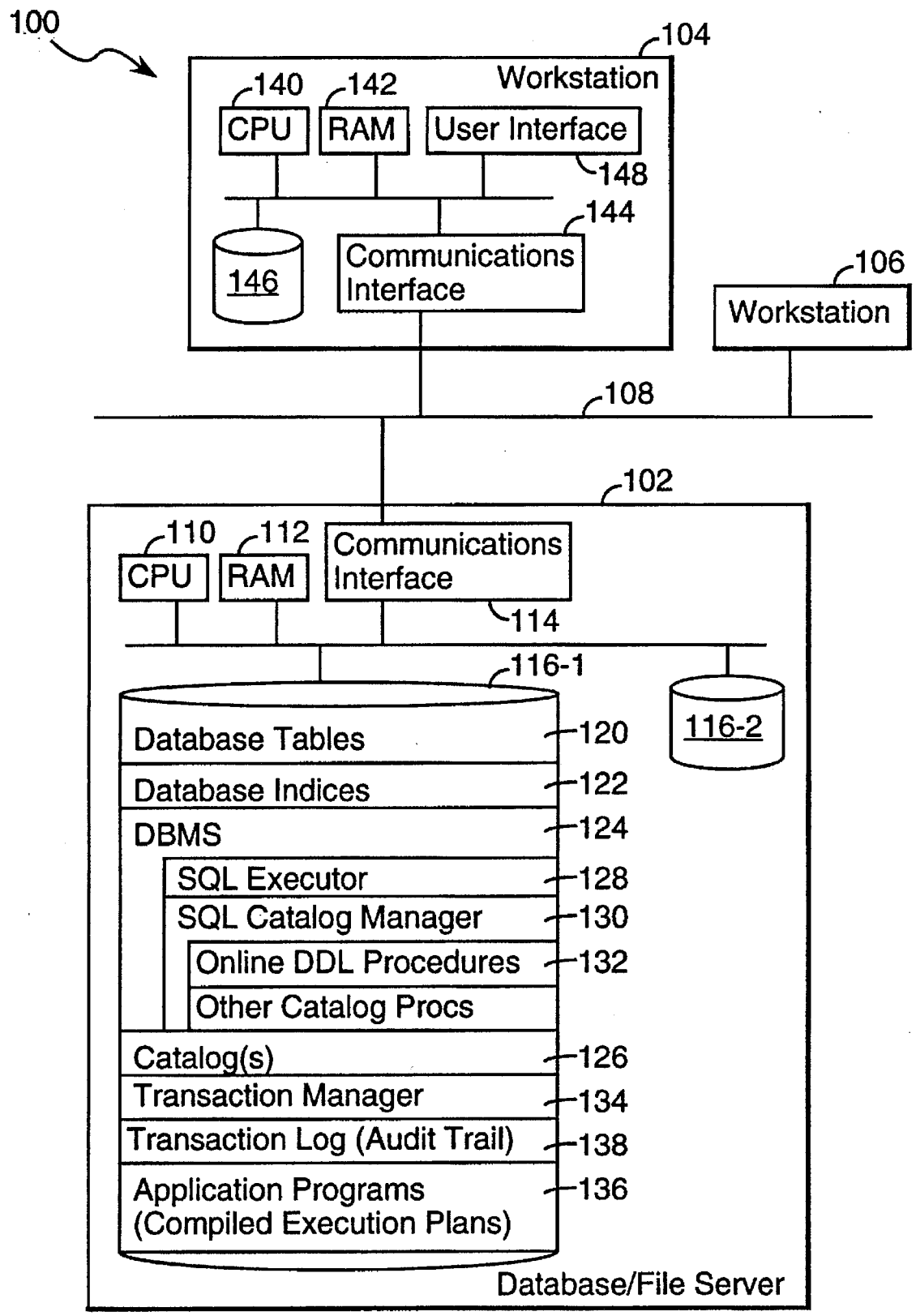
FIG. 1 is a block diagram of a computer system having a database management system in accordance with the present invention.

Referring to FIG. 1, there is shown a computer system 100 for storing and providing user access to data in stored databases. The system 100 is a distributed computer system having multiple computers 102, 104, 106 interconnected by local area and wide area network communication media 108. The system 100 generally includes at least one database server 102 and many user workstation computers or terminals 104, 106.

When very large databases are stored in a system, the database tables will be partitioned, and different partitions of the database tables will often be stored in different database servers. However, from the viewpoint of user workstation computers 104, 106, the database server 102 appears to be a single entity. The partitioning of databases and the use of multiple database servers is well known to those skilled in the art.

As shown in FIG. 1, the database server 102 includes a central processing unit (CPU) 110, primary memory 112, a communications interface 114 for communicating with user workstations 104, 106 as well as other system resources not relevant here. Secondary memory 116-1, 116-2, typically magnetic disc storage, in the database server 102 stores database tables 120, database indices 122, a database management system (DBMS) 124 for management of the database tables and associated data structures and resources, and one or more catalogs 126 for storing schema information about the database tables 120 as well directory information for programs used to access the database tables. The DBMS 124 includes an SQL executor 128 for executing SQL statements (i.e., database queries) and an SQL catalog manager 130 for maintenance of the catalogs 126 and for performing database definition and restructuring operations. The SQL catalog manager includes the "online DDL procedures" 132 of the present invention for restructuring database tables while providing improved user transaction access to the affected tables.

The database server 102 further includes a transaction manager 134 for managing transactions, and application programs 136 that are utilized by users to perform transactions that utilize the database tables 120. The transaction manager creates audit entries for each transaction, which are durably stored in an audit trail file 138 in secondary memory.

End user workstations 104, 106, typically include a central processing unit (CPU) 140, primary memory 142, a communications interface 144 for communicating with the database server 102 and other system resources, secondary memory 146, and a user interface 148. The user interface 148 typically includes a keyboard and display device, and may include additional resources such as a pointing device and printer. Secondary memory 146 is used for storing computer programs, such as communications software used to access the database server 102. Some end user workstations 106 may be "dumb" terminals that do not include any secondary memory 146, and thus execute only software downloaded into primary memory 142 from a server computer, such as the database server 102 or a file server (not shown).

Glossary

To assist the reader, the following glossary of terms used in this document is provided. SQL: SQL stands for "Structured Query Language." Most commercial database servers utilize SQL. Any program for accessing data in a database that utilizes SQL is herein called an "SQL Program." Each statement in an SQL program used to access data in a database is called an "SQL statement."

Object(s): An object is a file, database table or other encapsulated computer resource accessed by a program as a unitary structure. In the context of the preferred embodiment, objects are database tables or indexes. In other implementations of the present invention, objects may be other encapsulated computer resources that the end user accesses indirectly through validated methods (i.e., programs) designed specifically to access those computer resources.

DDL Statement: a data definition language statement. DDL statements are used to create and modify database tables.

End user: a person using a workstation to access database information in a database server. End users typically do not have the authority to modify the structure of database tables.

Operator: a person using a workstation who has the authority and access rights to modify the structure of database tables and to manually initiate compilation of SQL source code programs.

Audit Trial, Database Table and Index Data Structures

Figure 2A:
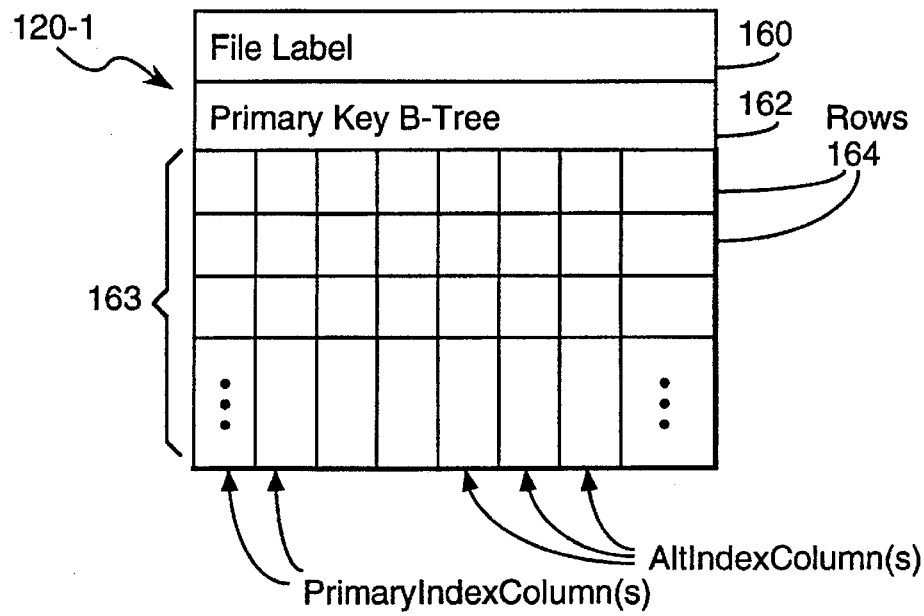
FIG. 2A is a block diagram of a database table.

FIG. 2A shows the data structure of a typical database table 120-1. The table 120-1 includes a file label 160, which is essentially a compactly stored copy of the catalog information for the database table, which represents the table's schema as well as other information not relevant here. Next, the table includes a primary key B-tree 162. The use of B-trees in database files is well known to those of ordinary skill in the art of database management systems. Next, the table has a data array 163 organized in rows and columns. The rows of the table are often called "records" 164.

In the context of the present invention, every database table has a primary index. The value of the primary index for a particular record is called the primary key, and the primary key is typically equal to either (A) the value in one field (i.e., column), (B) the concatenation of the values in a plurality of columns, or (C) a computed function of the values in one or more columns. The set of columns used to generate the primary key are represented by a vector herein called the PrimaryKeyColumns vector. There is a "Create_PrimaryKey" function for every database table, represented as follows:

PrimaryKey =Create_PrimaryKey(BaseTable(RecPtr), PrimaryKeyColumns)

where RecPtr is a pointer to a database table record.

It is often the case that an application program needs to access a database table in accordance with a set of column values, at least some of which are not included in the primary index. When that is the case, a Create Index procedure can be used to create an efficient alternate access path to the database table by ordering data according to the values in any specified set of columns. That ordering is represented by an "Alternate Index," which is typically implemented as a separate data structure from the associated database table.

Figure 2B:
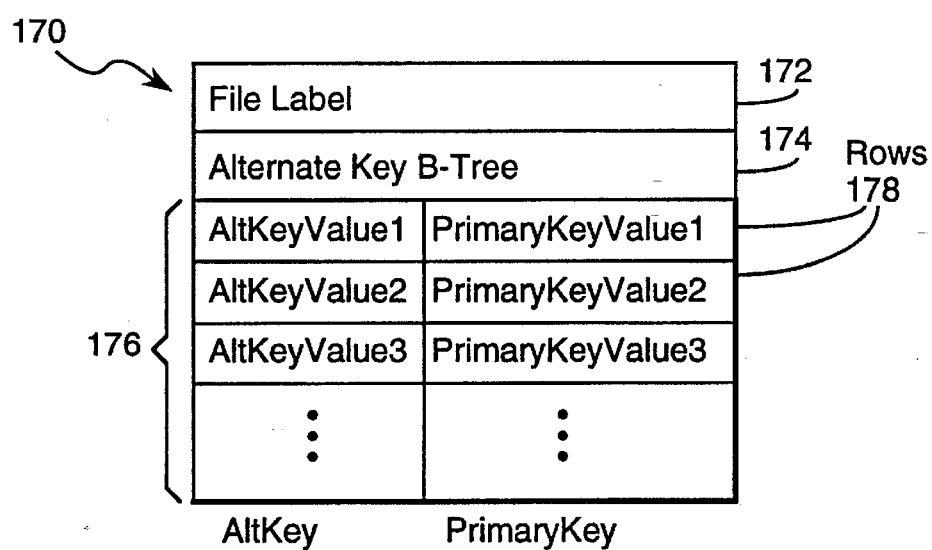
FIG. 2B is a block diagram of an alternate index.

FIG. 2B shows the data structure of an alternate index 170. The alternate index 170 includes a file label 172, which includes a compactly stored copy of the catalog information for the index. The alternate index also includes an alternate key B-tree 174 and then a data array 176 organized in rows and columns. The data array has two sets of columns herein called the AltKey columns and the PrimaryKey columns.

The rows of the data array 176 are called records 178, and each row of the Alternate Index corresponds to one record of the associated database table. Furthermore, each row of the Alternate Index has two fields: one represents the alternate key value for the corresponding database table record, and one represents the Primary Key value for the same database table record.

The set of columns used to generate the alternate key for a particular database table are represented by a vector herein called the AlternateKeyColumns vector. There is a "Create_AltKey" function for every alternate index of any database table, represented as follows:

AltKey=Create_AltKey(BaseTable(RecPtr), PrimaryKeyColumns)

where RecPtr is a pointer to a database table record.

For the purposes of the Move Partition, Split Partition and Move Partition Boundary operations, a database index may be viewed in the same way as a database table.

Figure 2C:
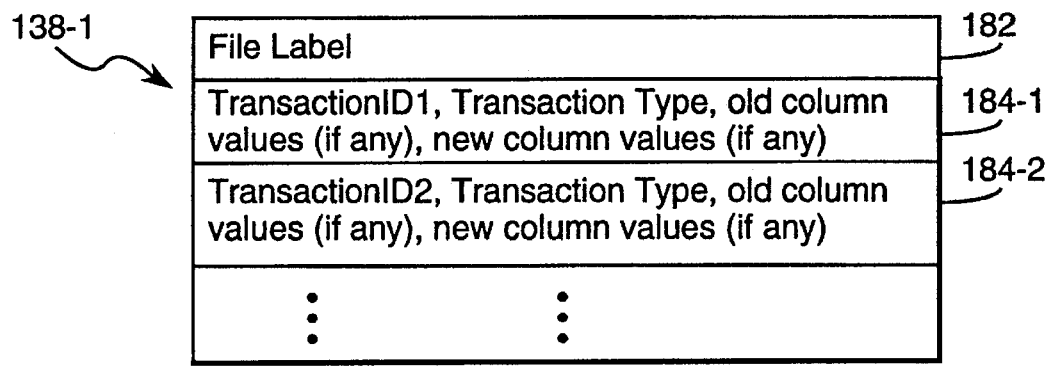
FIG. 2C is a block diagram of the data structure of an Audit Trail.

FIG. 2C shows the data structure of an Audit Trail 138-1. The Audit Trail includes a file label 182 and a set of sequentially generated and stored audit entries 184. Each audit entry 184 denotes a database table or index record event such as the addition, deletion or alteration of a specified database table or index record in a specified database table or index.

Database Table Alteration Procedures

Figure 3:
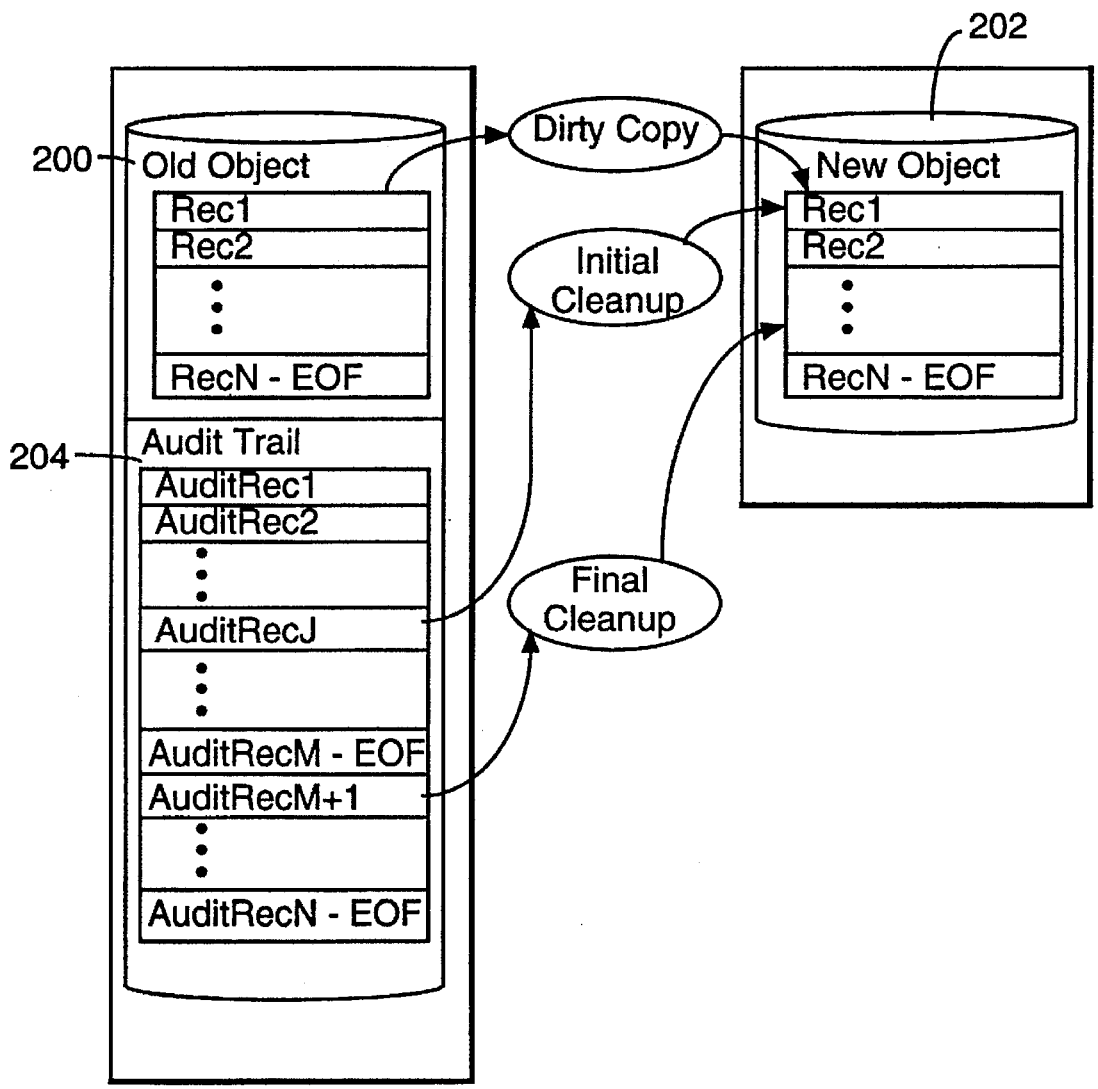
FIG. 3 is a conceptual diagram of the three primary phases of the database restructuring procedures in the present invention.
Figure 7C:
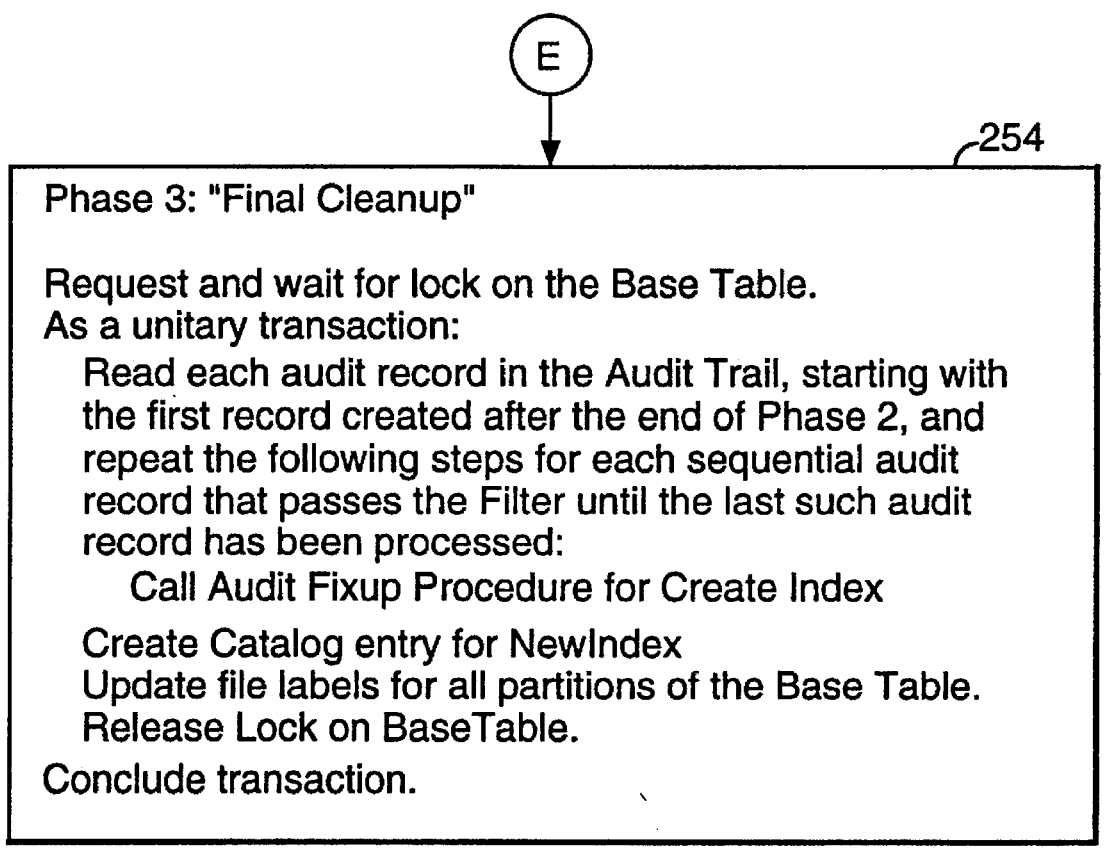

FIG. 3 is a conceptual representation of the procedure for modifying a database table or index. The commands for making database table or index alterations are called data definition language (DDL) statements. In the preferred embodiment, the DDL statements used are not changed, except for the use of an "ONLINE" option in the DDL statements to indicate that the DDL operation is to be performed while minimizing the impact of the DDL operation on user transactions. When the ONLINE option is specified, the preferred embodiment of the present invention changes how the SQL catalog manager 130 executes the Move Partition, Split Partition, Move Partition Boundary and Create Index commands.

The procedure for modifying a database table's structure begins with a user or operator entering a DDL Statement, specifying an alteration in the schema of a specified object 200, which is typically either a database table, an index, or a partition of a database table or index. The specified object is accessed to read its file label, and if the command requires generating a new object 202, the new object is created. If the command involves movement of data between the first object 200 and a second object 202 that already exists, the file label of the second object is also accessed.

In the first phase of execution of the "online DDL command," a "dirty copy" of data from the first object 200 into the second object 202 is made while user transactions against the first object (and against the second object if it existed prior to the command) are allowed to continue unimpeded by the execution of the DDL command. In particular, a "dirty copy" is made by accessing all the data records of the first object that are the subject of the DDL command, using "browse" access, and generating corresponding records in the second object 202 until the last of the relevant data records in the first object 200 have been accessed.

Browse access is a form of read access that allows database records to be read through any record locks that may be in place. Thus, browse access will sometimes result in the reading of records which are in the midst of being modified. Also, user transactions against the first object may delete or modify records in the first object while or after they are accessed by the first phase of the DDL command execution. As a result, the records created in the second object 202 may require a certain amount of correction.

In the second phase of execution of the online DDL command, a partial clean-up of the records in the second object is performed by accessing records in the audit trail 204 associated with the first object 200 and performing corresponding "redo" operations against the second object. During this second phase user transactions against the first object (and against the second object if it existed prior to the command) are allowed to continue unimpeded by the execution of the DDL command.

More specifically, before the dirty copy in the first phase of the online DDL command is executed, a pointer called AuditPtr is set to the end of the audit trail 204. During the second phase, each audit record beginning with the one referenced by the AuditPtr is inspected. If the audit record is relevant to operations performed on the first object 200, or relevant to the subset of records of the first object that are the subject of the DDL command, then a redo operation is performed against the second object 202 based on the information in the audit record. In the case of a Create Index command, the redo operation uses new audit records that are generated based on the audit entries found in the audit trail because the second object has a very different structure than the first object; in the case of the other three online DDL commands, the redo operation uses the audit record as found in the audit trail except that the audit record is modified prior to the redo operation so as to reference the second object instead of the first object, and the redo operation is performed against the second object.

The second phase continues until the end of the audit trail is reached.

In the third phase, a lock is requested against the first object and second object (if it existed prior to the DDL command), and when that lock (or those locks) is (are) granted all user transactions other than browse access transactions are blocked until the third phase is completed. During the third phase, any new audit records in the audit trail 204 associated with the first object 200 are accessed and corresponding "redo" operations are performed against the second object 202. Next, if the first object is a portion of a larger database table or index, a lock against the entire associated database table associated with the first object is obtained while catalog and file labels are updated. In particular, the catalog entries and the file labels associated with the first and second objects are updated to reflect the results of the DDL operation. Furthermore, the catalog entries and file labels of all objects which incorporate schema information made invalid by the DDL operation are also updated. Then the lock on the first and second objects (and the lock, if any, on the associated database table or index) is released, enabling user transactions against the first and second objects to resume.

Finally, if the DLL command requires deletion of the first object or deletion of a range of records in the first object, that deletion operation is performed in a way that permits concurrent transaction activity.

It is noted that the implementation of database reconfiguration operations using well established, optimized, database recovery process procedures makes the database reconfiguration operations efficient in terms of computation time and in terms of the computer resources used.

Appendix 1 lists a pseudocode representation of the Move Partition procedure used by the SQL catalog manager to move a database table partition from one disk to another.

Appendix 2 lists a pseudocode representation of the Split Partition procedure used by the SQL executor to split a database table partition into two partitions.

Appendix 3 lists a pseudocode representation of the Move Partition Boundary procedure used by the SQL catalog manager to move rows (i.e., records) of a database table between adjacent partitions (i.e., partitions with adjacent ranges of the table's primary index).

Appendix 4 lists a pseudocode representation of the Create Index procedure used by the SQL catalog manager to create a new "alternate" index for a database table.

Appendix 5 lists a pseudocode representation of an alternate embodiment of the Create Index procedure.

Appendices 6, 7 and 8 lists pseudocode representations of procedures used by the Create Index procedure.

The pseudocode used in Appendices 1 through 8 is, essentially, a computer language using universal computer language conventions. While the pseudocode employed here has been invented solely for the purposes of this description, it is designed to be easily understandable by any computer programmer skilled in the art.

Move Partition Procedure

The function of the Move Partition procedure is to move a database table or index, or a specified partition of the table or index, from a first disk location to a second disk location. The procedure is executed in response to a Move Partition command. The second disk location is typically located on a different disk from the first, and often will be located on a different computer node from the first. For the purposes of explaining the Move Partition procedure, it will be assumed that a partition of a database table is being moved, with the understanding that the same steps would be performed for moving an entire unpartitioned database file or for moving an index file or a partition of an index file.

Referring to FIG. 4 and Appendix 1, the steps of the Move Partition procedure are as follows. The database partition to be moved, herein called the Old Partition, is accessed, and a new file for the new database partition, herein called the New Partition, is created on the appropriate disk volume. Furthermore, an audit trail pointer, AuditPtr, is set to point to where the next record in the audit trail for transactions against the database table associated with the Old Partition will be located.

In the first phase (220) of the Move Partition procedure, the records in the Old Partition are accessed using Browse access (i.e., read through locks), and records are copied from the Old Partition to the New Partition. While records are created in the New Partition, an up-to-date primary index B-tree is maintained for the New Partition. To prevent further repetition, it is noted that for all records created and updated by the online DDL procedures, a corresponding B-tree is updated.

Transactions by end users against the Old Partition are allowed to continue during this phase of the Move Partition procedure, and those transactions continue to insert, delete and update records in the Old Partition and create new audit trail entries in the audit trail.

In the second phase (222) of the Move Partition procedure, transactions by end users against the Old Partition are allowed to continue, and those transactions insert, delete and update records in the Old Partition and create new audit trail entries in the audit trail.

At the beginning of the second phase, an AuditTrail filter is established such that only Audit Trail records that pertain to the Old Partition are received for processing (by an Audit Fixup Process started by the SQL catalog manager). The processing of each audit record that passes the filter is called an "audit fixup".

Each received audit record that passes the filter is initially processed by modifying the audit record to refer to the NewPartition. Next, the modified audit record is inspected to determine whether the change to the table noted in the audit record is already reflected in the copied records. If so, the audit record is ignored. Otherwise, a "redo" with respect to the modified audit record is performed so as to apply the change noted in the modified audit record to the NewPartition. This process is repeated for each received audit record that passes the filter until the end of the audit trail is reached.

In the third phase (224) of the Move Partition procedure, a transaction request is made for a file lock on the Old Partition. This is a transaction request that goes in the lock queue. User transactions initiated before the third phase are not affected, but the lock request prevents users from committing transactions initiated after the lock request is made. When the requested lock is granted the remainder of the third phase is performed as a unitary transaction. The first part of the third phase transaction is performing the audit fixup process described above for all audit records referencing the Old Partition (i.e., that pass the filter) that were created after completion of the second phase.

When processing of the last such audit record in the audit trail is completed, the third phase transaction requests a lock on the entire database table associated with the Old Partition. This prevents all user transactions on the entire database table until the lock is released. When the full table lock is granted, the catalog entry for the Old Partition is deleted and a new catalog entry for the New Partition is created. The file labels and catalog entries for all partitions of the database table are also updated so as to reference the New Partition.

When all catalog and file label updates have been completed, the lock on the database table is released, enabling user transactions against the database table to resume. Finally, the Old Partition is deleted, the disk space used by the Old Partition file is released, and then the third phase transaction is concluded.

Split Partition Procedure

The function of the Split Partition procedure is to move a portion of a database table, or a portion of specified partition of a database table, from a first disk location to a second disk location. The procedure is executed in response to a Split Partition command. The second disk location is typically located on a different disk from the first, and often will be located on a different computer node from the first. For the purposes of explaining the Split Partition procedure, it will be assumed that a partition of a database file is being split into two partitions, with the understanding that the same steps would be performed for splitting a previously unpartitioned database file or for splitting an index file or a partition of an index file.

Referring to FIG. 5 and Appendix 2, the steps of the Split Partition procedure are as follows. The database partition to be split, herein called the Old Partition, is accessed, and a new file for the new database partition, herein called the New Partition, is created on the appropriate disk volume. Furthermore, an audit trail pointer, AuditPtr, is set to point to where the next record in the audit trail for transactions against the database table associated with the Old Partition will be located.

The primary key ranges associated with the Old Partition and New Partition are as follows. The Old Partition's initial primary key range is called OldRange, and its new, reduced primary key range is called NewRange1. The primary key range for the New Partition is called NewRange2.

In the first phase (230) of the Split Partition procedure, the records in the Old Partition having a primary key in NewRange2 are accessed using Browse access (i.e., read through locks), and are copied from the Old Partition to the New Partition.

Transactions by end users against the Old Partition are allowed to continue during this phase of the Split Partition procedure, and those transactions insert, delete and update records in the Old Partition and create new audit trail entries in the audit trail.

In the second phase (232) of the Split Partition procedure, transactions by end users against the Old Partition are allowed to continue, and those transactions insert, delete and update records in the Old Partition and create new audit trail entries in the audit trail.

At the beginning of the second phase, an AuditTrail filter is established such that only Audit Trail records that pertain to the Old Partition with a primary key value in NewRange2 are received for processing.

Each remaining received audit record is initially processed by modifying the audit record to refer to the NewPartition. Next, the modified audit record is inspected to determine whether the change to the table noted in the audit record is already reflected in the copied records. If so, the audit record is ignored. Otherwise, a "redo" with respect to the modified audit record is performed so as to apply the change noted in the modified audit record to the NewPartition. This process is repeated for each received audit record that passes the filter until the end of the audit trail is reached.

In the third phase (234) of the Split Partition procedure, a transaction request is made for a lock on the Old Partition. This is a transaction request that goes in the lock queue. User transactions initiated before the third phase are not affected, but the lock request prevents users from committing transactions initiated after the lock request is made. When the requested lock is granted the remainder of the third phase is performed as a unitary transaction. The first part of the third phase transaction is performing the audit fixup process described above for all audit records referencing the Old Partition that were created after completion of the second phase and for which either the old record image or new record image has a primary key value in NewRange2 (i.e., that pass the filter).

When processing of the last such audit record in the audit trail is completed, the B-tree for Old Partition is split into two B-trees, one for records having a primary key in NewRange1 and the other for records having a primary key in NewRange2.

Then the third phase transaction requests a lock on the entire database table associated with the Old Partition. This permits existing user transactions that work on the table to complete, but suspends all new user transactions on the entire database table until the lock is released. When the full table lock is granted, the catalog entry for the Old Partition is deleted and a catalog entry for the New Partition is created. The file labels and catalog entries for all partitions of the database table are also updated so as to reference the New Partition.

When all catalog and file label updates have been completed, the lock on the database table is released, enabling user transactions against the database table to resume. Finally, an access check is put in place to make application transactions unable to access records in the NewRange2 B-tree of the OldPartition, and then the third phase transaction is concluded.

All records in the NewRange2 part of the Old Partition are deleted without interfering with concurrent application transactions against the table, and then the access check for the OldPartition is removed.

Move Partition Boundary Procedure

The function of the Move Partition Boundary procedure is to move records in a specified range of primary key values from a first specified partition of a database table to a second adjacent partition of that database table. The second partition is typically located on a different disk from the first, and often will be located on a different computer node from the first. The procedure is executed in response to a Move Partition Boundary command. For the purposes of explaining the Move Partition Boundary procedure, it will be assumed that records are being moved between adjacent database file partitions, with the understanding that the same steps would be performed for moving records between adjacent index file partitions.

Referring to FIG. 6 and Appendix 3, the steps of the Move Partition Boundary procedure are as follows. The database partition from which records are to be moved is herein called Partition1 and the database partition to which those records are to be moved is called Partition2. An audit trail pointer, AuditPtr, is set to point to where the next record in the audit trail for transactions against the database table will be located.

The primary key ranges associated with Partition1 and Partition2 are as follows. Partition 1's initial primary key range is called OldRange 1, and its new, reduced primary key range is called NewRange1. The initial primary key range for the Partition2 iS called OldRange2 and its new expanded key range is called NewRange2. The primary key range of the records to be moved, called MoveRange, is equal to the range of primary key values in NewRange2 that are not in OldRange2.

In the first phase (240) of the Move Partition Boundary procedure, the records in the Old Partition having a primary key in the MoveRange are accessed using Browse access (i.e., read through locks), and are copied from Partition1 to Partition2.

Transactions by end users against Partition1 and Partition2 are allowed to continue during this phase of the Move Partition Boundary procedure, and those transactions insert, delete and update records in Partition 1 and Partition2 and create new audit trail entries in the audit trail.

In the second phase (242) of the Move Partition Boundary procedure, transactions by end users against Partition1 and Partition2 are allowed to continue, and those transactions insert, delete and update records in Partition1 and Partition2 and create additional new audit trail entries in the audit trail.

At the beginning of the second phase, an AuditTrail filter is established such that only Audit Trail records that pertain to the Partition1 are received for processing by the SQL catalog manager. Furthermore, those audit records for which neither the old record image (if any) nor the new record image (if any) have a primary key value in the MoveRange are also ignored.

Each remaining received audit record is initially processed by modifying the audit record to refer to the Partition2. Next, the modified audit record is inspected to determine whether the change to the table noted in the audit record is already reflected in the copied records. If so, the audit record is ignored. Otherwise, a "redo" with respect to the modified audit record is performed so as to apply the change noted in the modified audit record to Partition2. This process is repeated for each received audit record that passes the filter until the end of the audit trail is reached.

In the third phase (244) of the Move Partition Boundary procedure, a transaction request is made for a lock on the Old Partition. This is a transaction request that goes in the lock queue. User transactions initiated before the third phase are not affected, but the lock request prevents users from committing transactions initiated after the lock request is made. When the requested lock is granted the remainder of the third phase is performed as a unitary transaction. The first part of the third phase transaction is performing the audit fixup process described above for all audit records referencing Partition1 that were created after completion of the second phase and for which either the old record image or new record image has a primary key value in the MoveRange (i.e., that pass the filter).

When processing of the last such audit record in the audit trail is completed, the B-tree for Partition1 is split into two B-trees, one for records having a primary key in NewRange1 and the other for records having a primary key in the MoveRange.

Then the third phase transaction requests a lock on the entire database table associated with Partition1 and Partition2. This permits existing user transactions that work on the table to complete, but suspends all new user transactions on the entire database table until the lock is released. When the full table lock is granted, the catalog entries and file labels for Partition1 and Partition2 are updated to reflect their new primary key ranges. Furthermore, the catalog entries for all partitions of the database table are also updated so as to reference the key ranges of Partition 1 and Partition2.

When all catalog and file label updates have been completed, the lock on the database table is released, enabling user transactions against the database table to be initiated and executed. Finally, an access check is put in place to make application transactions unable to access records in the MoveRange B-tree of the OldPartition, and then the third phase transaction is concluded.

All records in the MoveRange part of the Old Partition are deleted without interfering with concurrent application transactions against the table, and then the access check for the OldPartition is removed.

Create Index Procedure

The function of the Create Index procedure is to create an alternate index for a database table, where the alternate index is generally a different function of the database table columns than the primary index for the database table.

Referring to FIG. 6 and Appendices 4, 5, 6 and 7, the steps of the Create Index procedure are as follows. The database object from which records are to be indexed is herein called the Base Table and the alternate index being created is called the NewIndex. The set of columns used to generate the alternate key for the NewIndex are represented by a vector called the AlternateKeyColumns vector. Furthermore, a flag called UniqueIndexFlag is set to True if the NewIndex is to be a unique index, which means that every record in the Base Table must have a unique alternate index value, and is set to False if multiple records in the Base Table are allowed to have the same alternate index value.

An audit trail pointer, AuditPtr, is set to point to where the next record in the audit trail for transactions against the database table will be located.

In the first phase (250) of the Create Index procedure, the records in the Base Table are accessed using Browse access (i.e., read through locks), and for each such record a "create new index record" procedure 251 is performed. The "create new index record" procedure 251, which is also used in the later phases of the Create Index procedure, begins by computing primary and alternate index values for a particular record using the index generation functions:

PrimaryKey1=Create_PrimaryKey(Record, PrimaryKeyColumns)

AltKey1=Create_AltKey(Record, PrimaryKeyColumns)
If the UniqueIndexFlag is False, an index record with AltKey1 and PrimaryKey1 as its two fields is stored in the NewIndex.

If the UniqueIndexFlag is set to True, prior to storing an index record with AltKey1 and PrimaryKey1 as its two fields in the NewIndex, the NewIndex is searched to see if NewIndex already has a record with an alternate index value of AltKey1. If such a record is found in the NewIndex, a potential duplicate index problem exists. To resolve whether a duplicate index problem has been encountered, two tests are performed. First, a repeatable read transaction is performed on the Base Table to see if the Base Table still stores a record with primary and alternate key values of PrimaryKey1 and AltKey1. If such a record is found in the Base Table, the second test is performed.

The existing NewIndex record with an alternate key value of AltKey1 is read (with a repeatable read operation) to determine the primary key value, PrimaryKey2, stored with it. If this NewIndex record still exists, a second repeatable read transaction is performed on the Base Table to see if the Base Table stores a record with a primary key value of PrimaryKey2 and an alternate key value of AltKey1. If both tests produce positive results, the Create Index procedure is aborted because two database records with identical alternate key values have been encountered. Otherwise, if either test returns a negative result, an index record with AltKey1 and PrimaryKey1 as its two fields is stored in the NewIndex, and the index record with AltKey1 and PrimaryKey2 (if any) is deleted from the NewIndex.

In the second phase (252) of the Create Index procedure, transactions by end users against the Base Table are allowed to continue, and those transactions insert, delete and update records in the Base Table and create additional new audit trail entries in the audit trail.

At the beginning of the second phase, an AuditTrail filter is established such that only Audit Trail records that pertain to the Base Table are received for processing by the SQL catalog manager. Each received audit record is processed by an "audit fixup for create index" procedure 253 specially designed for use as part of the Create Index procedure.

The "audit fixup for create index" procedure 253 processes an audit record as follows. If the audit record denotes a change to a Base Table record that does not alter either the primary key or the alternate key of the record, or the change is already reflected in the NewIndex, the audit record is ignored.

If the audit record denotes deletion of a Base Table record, an audit record representing deletion of the associated NewIndex record is constructed and a "redo" of the newly created audit record against the NewIndex is performed. As a result, the associated NewIndex record is deleted, if one exists.

If the audit record denotes addition of a Base Table record, an audit record representing insertion of a corresponding NewIndex record is constructed and a "redo" of the newly created audit record against the NewIndex is performed. If a unique alternate index is being created and a duplicate NewIndex record with the same primary and alternate key values is found during this procedure, the index creation procedure is aborted. Otherwise, the aforementioned steps result in a new index record being stored in the NewIndex for the inserted Base Table record.

Finally, if the audit record indicates that either the primary index or alternate index of a record have been altered, then a first audit record representing deletion of the NewIndex record associated with the record's old value is constructed, and a second audit record representing insertion of a new NewIndex record corresponding to the record's new value is constructed. Redo's of both constructed audit records are then performed against the NewIndex. If a unique alternate index is being created and a duplicate NewIndex record with the same primary and alternate key values is found during this procedure, the index creation procedure is aborted. Otherwise, the aforementioned steps result in a new index record being stored in the NewIndex for the altered Base Table record, and deletion of the prior NewIndex record for that Base Table record.

In the third phase (254) of the Create Index procedure, a transaction request is made for a lock on the Base Table. This is a transaction request that goes in the lock queue. User transactions initiated before the third phase are not affected, but the lock request prevents users from committing transactions initiated after the lock request is made. When the requested lock is granted the remainder of the third phase is performed as a unitary transaction. The first part of the third phase transaction is performing the "audit fixup for create index" process 253 described above for all audit records referencing the Base Table that were created after completion of the second phase (i.e., that pass the filter).

When processing of the last such audit record in the audit trail is completed, a catalog entry for the NewIndex is created, and file labels for all partitions of the Base Table are updated to reflect the existence of the NewIndex. Then the lock on the Base Table is released, the third phase transaction is concluded, and the Create Index procedure is completed.

In an alternate embodiment, represented in Appendix 5, the first phase of the Create Index procedure utilizes an indexing procedure that processes the entire Base Table, even if records that potentially have duplicate alternate key values are encountered. All such potential duplicate records are copied to a scratch pad memory area, and then are processed by the "create new index record" procedure 251 to determine if records with duplicate alternate key values in fact exist, and to add additional records to the NewIndex if no duplicate alternate key values are found.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

- 28 -

APPENDIX 1

Pseudocode Representation of Move Partition Procedure

```
     Procedure MovePartition (OldPartition, NewPartition)
        /*  OldPartition identifies the partition to be moved
            NewPartition identifies the new partition to be created
            BaseTable is the database table associated with the OldPartition */
     {
     /* Phase 1: Dirty Copy */
     Access current database partition (OldPartition) to be moved
     Create file for new database partition (NewPartition)
     Create file label for the NewPartition
     AuditPtr = End of Audit Trail
         /*  AuditPtr initially points to where the next record in the Audit Trail will
             be located, when it is generated */

While accessing records in the OldPartition, using Browse access (i.e., read
             through locks), copy records from the OldPartition to the NewPartition
     Maintain an up-to-date primary index B-tree for each record copied into the
             NewPartition
     All transactions by end users continue to insert, delete and update records in
             the OldPartition and to create new audit trail entries
     /* Phase 2: Partial Cleanup */
     Establish AuditTrail filter: Access only Audit Trail records that pertain to the
             OldPartition
     Do Until End of Audit Trail is reached
         {
         /* Process entry in Audit Trail at AuditPtr */
         Modify the Audit Record to refer to the NewPartition
         If the change to the table noted in the audit record is already reflected in
                 the copied records
                 { Ignore Audit Record }
         Else
             {
                 Perform a "Redo" with respect to the modified Audit Record so as to
                         apply the change noted in the Audit Record to the NewPartition
```

- 29 -

```
        Update B-tree for the NewPartition for each update to the
            NewPartition
        }
        Update AuditPtr to Next Audit Record (skip records that do not pertain to
            the OldPartition)
        } /* End Do Loop */

/* Phase 3: Final Cleanup */
    Request and Wait for Lock on the OldPartition
    /*  This is a transaction request that goes in the lock queue.  This does not
        affect transactions initiated before Phase 3, but prevents users from
        committing transactions initiated after the Lock Request is made. */
    /*  When Lock is granted ... */
    Do As A Unitary Transaction
        {
        LastPtr = Last Record in Audit Trail
        /*  Previously established Audit Trail Filter continued to filter out audit
            records not applicable to the OldPartition */
        Do Until End of AuditPtr reaches LastPtr:
            {
            Modify the Audit Record to refer to the NewPartition
            Perform a "Redo" with respect to the modified Audit Record so as to
                apply the change noted in the Audit Record to the NewPartition
            Update B-tree for the NewPartition for each update to the
25              NewPartition Update AuditPtr to Next Audit Record (skip records that do not
                pertain to the OldPartition)
            } /* End Do Loop */
        Request Lock on the entire Base Table
        When Lock is granted:
            Delete Catalog entry for the OldPartition
            Create Catalog entry for the NewPartition
            Update file labels and catalog entries for all partitions of BaseTable
                so as to reference the NewPartition Release Lock on BaseTable, enabling user transactions against the
            Base Table to resume execution
```

- 30 -

Delete the OldPartition and release disk space used by the OldPartition
   file
} /* End of transaction */

5   Return

- 31 -

APPENDIX 2

Pseudocode Representation of Split Partition Procedure

```
     Procedure SplitPartition (BaseTable, OldPartition, OldRange, NewRange1,
        NewRange2, NewPartition)

/*  OldPartition identifies the partition to be split
            NewPartition identifies the new partition to be created
            OldRange is the range of Primary Key values currently assigned to
            the OldPartition
            NewRange1 is the new range of Primary Key values assigned to the
            OldPartition
            NewRange2 is the range of Primary Key values assigned to the
            NewPartition to be created
            BaseTable is the database table associated with the OldPartition
        */

Access current database partition (OldPartition) to be split
        Create file for new database partition (NewPartition)
        Create file label for the NewPartition
        AuditPtr = End of Audit Trail
            /*  AuditPtr initially points to where the next record in the Audit Trail will
                be located, when it is generated */

        /* Phase 1: Dirty Copy */
        While accessing records in the OldPartition, using Browse access (i.e., read
            through locks), copy records having a Primary Key value in NewRange2
            from the OldPartition to the NewPartition
        Maintain an up-to-date primary index B-tree for each record copied into the
            NewPartition
        All transactions by end users continue to insert, delete and update records in
            the OldPartition and to create new audit trail entries
        /* Phase 2: Partial Cleanup */
        Establish AuditTrail filter: Access only Audit Trail records that pertain to the
            OldPartition with a Primary Key value in NewRange2
        Do Until End of Audit Trail is reached
            {
```

- 32 -

```
         /* Process entry in Audit Trail at AuditPtr */
         Modify the Audit Record to refer to Partition2
         If the change to the table noted in the audit record is not already
               reflected in the copied records
             {
              Perform a "Redo" with respect to the modified Audit Record so as to
                 apply the change noted in the Audit Record to Partition2
              Update B-tree for Partition2 for each update to Partition2
              }
 10
           Update AuditPtr to Next Audit Record (skip records that do not pertain to
              Partition1 or with a Primary Key value not in NewRange2)
         } /* End Do Loop */

        /* Phase 3: Final Cleanup */
         Request Lock on the OldPartition
         /*  This is a transaction request that goes in the lock queue.  This does not
             affect transactions initiated before Phase 3, but prevents users from
             committing transactions initiated after the Lock Request is made. */
         /*  When Lock is granted ... */
         Do as a Unitary Transaction:
            {
            LastPtr = Last Record in Audit Trail
            /*  Previously established Audit Trail Filter continued to filter out audit
                records not applicable to NewRange2 in the OldPartition */
            Do Until End of AuditPtr reaches LastPtr
               {
               Modify the Audit Record to refer to the NewPartition
               Perform a "Redo" with respect to the modified Audit Record so as to
                  apply the change noted in the Audit Record to the NewPartition
               Update B-tree for the NewPartition for each update to the
                  NewPartition
               Update AuditPtr to Next Audit Record (skip records that do not
                  pertain to NewRange2 in the OldPartition)
               }
            }   /* End Do Loop */
```

- 33 -

Split the B-tree for Partition1 into two B-trees, one for records in NewRange1 (those remaining in Partition1) and one for the records in NewRange2 to be removed from Partition1 (the Prune B-tree).

Request Lock on the entire Base Table
When Lock is granted:
    Update Catalog entry for the OldPartition to reflect new index boundaries for the OldPartition
    Update label for the OldPartition, including putting in place an
          access check that prevents user transaction from accessing NewRange2
    Create Catalog entry for the NewPartition
    Update file labels and catalog entries for all partitions of BaseTable to reference the NewPartition

Release Lock on BaseTable, enabling user transactions against the Base Table to resume execution }  /* end of unitary transaction for third phase */

/* Phase 4: Background garbage collection */
In background mode:
    Delete all records from the OldPartition that are referenced by the Prune B-tree (this releases unused space from the OldPartition file)
      Remove access check in the OldPartition
Return

- 34 -

APPENDIX 3

Pseudocode Representation of Move Partition Boundary Procedure

    Procedure MovePartitionBoundary (Partition1, OldRange1, NewRange1,
         Partition2, OldRange2, NewRange2)

/*  BaseTable is database table associated with Partition1 and
        Partition2
        Partition1 and Partition2 identify two partitions having adjacent
        assigned Primary Key Ranges
        OldRange1 is the range of Primary Key values currently assigned to
        Partition1
        OldRange2 is the range of Primary Key values currently assigned to
        Partition2
        NewRange1 is the new range of Primary Key values assigned to
        Partition1
        NewRange2 is the new range of Primary Key values assigned to
        Partition2
    */

Access database Partition1 and Partition2
    AuditPtr = End of Audit Trail
       /* AuditPtr initially points to where the next record in the Audit Trail will
          be located, when it is generated */
    Generate MoveRange = range of Primary Key values for records in
        NewRange2 that are not in OldRange2

/* Phase 1: Dirty Copy */
    While accessing records in Partition1 using Browse access, copy records
        having a Primary Key value in MoveRange from Partition1 to Partition2
    Update primary index B-tree for Partition2 for each record copied into
        Partition2. Leave B-tree for Partition1 unchanged.
    All transactions by end users continue (A) to insert, delete and update
        records in Partition1 and Partition2 using old partition range boundaries
        and (B) to create new audit trail entries

- 35 -

```
     /* Phase 2: Partial Cleanup */
     Establish AuditTrail filter: Access only Audit Trail records that pertain to
          Partition1 with Primary Key values in MoveRange
     Do Until End of Audit Trail is reached
         {
          /* Process entry in Audit Trail at AuditPtr */
          Modify the Audit Record to refer to Partition2
          If the change to the table noted in the audit record is not already
               reflected in the copied records
10             {
               Perform a "Redo" with respect to the modified Audit Record so as to
                    apply the change noted in the Audit Record to Partition2
               Update B-tree for Partition2 for each update to Partition2
               }
15
          Update AuditPtr to Next Audit Record (skip records that do not pertain to
               Partition1 or with a Primary Key value not in MoveRange)
          } /* End Do Loop */

     /* Phase 3: Final Cleanup */
     Request Lock on Partition1 and Partition2
          /*  This is a transaction request that goes in the lock queue.  This does not
               affect transactions initiated before Phase 3, but prevents users from
               committing transactions initiated after the Lock Request is made. */
          /*  When Lock is granted ... */
     Do as a Unitary Transaction:
          {
          LastPtr = Last Record in Audit Trail
          /*  Previously established Audit Trail Filter continued to filter out audit
               records not applicable to MoveRange in Partition1 */
          Do Until End of AuditPtr reaches LastPtr
               {
               Modify the Audit Record to refer to Partition2
               Perform a "Redo" with respect to the modified Audit Record so as to
                    apply the change noted in the Audit Record to Partition2
                    Update B-tree for Partition2 for each update to Partition2
               Update AuditPtr to Next Audit Record (skip records that do not
                    pertain to MoveRange in Partition1)
               } /* End Do Loop */
```

- 36 -

```
          Split the B-tree for Partition1 into two B-trees, one for records in
              NewRange1 (those remaining in Partition1) and one for the records
              in the MoveRange to be removed from Partition1 (the Prune B-tree).

        Request Lock on entire Base Table
          When Lock is granted:
                  Update Catalog entry for Partition1 to reflect new partition key
                      boundaries for Partition1
                  Update label for Partition1, including putting in place an access
                      check that prevents user transactions from accessing
                      MoveRange
                  Update Catalog entry for Partition2 to reflect new partition key
                      boundaries for Partition2
                  Update label for Partition2
                  Update file labels and catalog entries for all partitions of BaseTable
                      to reflect the new partition key boundaries for Partition1 and
                      Partition2

Release Locks on BaseTable (including Partition1 and Partition2),
              enabling user transactions against the Base Table to resume
              execution
          }   / * end of unitary transaction for third phase */

/* Phase 4: Background garbage collection */
          In background mode:
                  Delete all records from Partition1 that are referenced by the Prune
                      B-tree (this releases unused space from Partition1 file).
                  Remove access check in Partition1
          Return
```

- 37 -

APPENDIX 4

Pseudocode Representation of Create Index Procedure

```
    CreateIndex Procedure (BaseTable, AltIndexColumns, UniqueIndexFlag,
        NewIndex)
        /*  BaseTable is table for which index is to be created.
            AltIndexColumns is a vector listing the table columns that define the
            key for the New Index.
            UniqueIndexFlag is equal to True if the new index must be a unique
            index (i.e., an index for which every base table record has a unique
            alternate key value).
            NewIndex is the new index to be created
            PrimaryIndexColumns is a vector listing the table columns that
            define the key for the Primary Index of the Base Table
        */

/*  Structure of NewIndex (and every other index, other than the primary
            index) is:
            File Label  - embedded copy of catalog information for index
            B-tree      - the B-tree for the index
            Index Records, where each index record has two fields:
                AltKey, PrimaryKey
                where the AltKey field stores the value of the AltIndexColumns
                    for one record of the BaseTable, and the PrimaryKey field
                    stores the value of the primary key (i.e., the
                    PrimaryIndexColumns) for that same record
        */
        Create File for NewIndex, including root node for the new index's B-tree
        Create file label for NewIndex
        AuditPtr = End of Audit Trail
            /*  AuditPtr initially points to where the next record in the Audit Trail will
                be located, when it is generated */
        RecPtr = First Record of BaseTable
```

- 38 -

```
     /* Phase 1: Dirty Copy */
     Do Until End of BaseTable is Reached
             {
             Access, using Browse access, BaseTable(RecPtr)
             AltKey1 = Create_AltKey( BaseTable(RecPtr), AltIndexColumns)
             PrimaryKey1 = Create_PrimaryKey( BaseTable(RecPtr),
                 PrimaryIndexColumns )

/* Check for Duplicate Index Values only if UniqueIndexFlag is True*/
             If UniqueIndexFlag
                 {
                 Search NewIndex for an index record with
                     NewIndex.AltKey equal to AltKey1
                 If a match is found
15                   {
                     Call CheckDupRecord (BaseTable, NewIndex,
                         BaseTable(RecPtr))
                     If ReturnCode = "fail"
                         Abort CreateIndex Procedure
20                   }
                 Else
                     Call CreateIndexRecord (NewIndex, AltKey1, PrimaryKey1)
                 }
             Else    / * UniqueIndexFlag is False */
25               Call CreateIndexRecord (NewIndex, AltKey1, PrimaryKey1)

Increment RecPtr to point to next BaseTable record, if any
             }    /* end of Do loop */

     /* Phase 2: Partial Cleanup */
     Establish AuditTrail filter: Access only Audit Trail records that pertain to the
         Base Table
     Do Until End of Audit Trail is reached
             {
             Call AuditRecord_to_NewIndex (AuditPtr, BaseTable, NewIndex,
                 IndexPtr) for the current Audit Record
             Update AuditPtr to Next Audit Record (skip records that do not pertain to
                 the Base Table)
             }
```

```
/* Phase 3: Final Cleanup */
Request Lock on the Base Table
    /*  This is a transaction request that goes in the lock queue.  This does not
        affect transactions initiated before Phase 3, but prevents users from
        committing transactions initiated after the Lock Request is made. */
    /*  When Lock is granted ... */
    Do as a Unitary Transaction:
        {
        LastPtr = Last Record in Audit Trail
        /*  Previously established Audit Trail Filter continued to filter out audit
            records not applicable to the Base Table */
        Do Until End of AuditPtr = LastPtr
            {
            Call AuditRecord_to_NewIndex (AuditPtr, BaseTable, NewIndex) for
                the current Audit Record
            Update AuditPtr to Next Audit Record (skip records that do not
                pertain to the Base Table)
            } /* End Do Loop */

Create Catalog entry for NewIndex
        Update file labels and catalog entries for all partitions of BaseTable to
            reference the NewIndex Release Lock on BaseTable, enabling user transactions against the
            Base Table to resume execution
        }   / * end of unitary transaction for third phase */

Return
```

- 40 -

APPENDIX 5

Pseudocode for Second Preferred Embodiment
of Phase 1 of Create Index Procedure

```
        /* Phase 1: Dirty Copy */
        Initialize ScratchPad pointer SP_Ptr
        Do Until End of BaseTable is Reached
            {
            Access, using Browse access, BaseTable(RecPtr)
            AltKey1 = Create_AltKey( BaseTable(RecPtr), AltIndexColumns)
            PrimaryKey1 = Create_PrimaryKey( BaseTable(RecPtr),
                PrimaryIndexColumns )

            /* Check for Duplicate Index Values only if UniqueIndex is True*/
            If UniqueIndexFlag
                {
                Search NewIndex for an index record with
                    NewIndex.AltKey equal to AltKey1
                If a match is found
                    {
                    Store RecPtr in ScratchPad(SP_Ptr)
                    Increment SP_Ptr
                    }
                Else
                    Call CreateIndexRecord (NewIndex, AltKey1, PrimaryKey1)
                }
            Else    /* UniqueIndexFlag is False */
                Call CreateIndexRecord (NewIndex, AltKey1, PrimaryKey1)
            Increment RecPtr to point to next BaseTable record, if any
            }   /* end of Do loop */

/* Process Records in ScratchPad */
        Initialize ScratchPad pointer SP_Ptr
        Do Until End of ScratchPad is reached
            {
            RecPtr = ScratchPad(SP_Ptr)
            Call CheckDupRecord (BaseTable, NewIndex, BaseTable(RecPtr))
```

```
        If ReturnCode = "fail"
              Abort CreateIndex Procedure
        Increment SP_Ptr to point to next ScratchPad entry, if any
        }
    /* end of Phase 1 */
```

APPENDIX 6

Pseudocode Representation of Create Index Record Procedure

```
Procedure CreateIndexRecord (NewIndex, NewAltKey, NewPrimaryKey)

/*  NewIndex is the new index in which a new record is to be created.
        NewAltKey is the alternate key of a record in the BaseTable for
            which an index record is to be created.
        NewPrimaryKey is the primary key of a record in the BaseTable for
            which an index record is to be created.
    */

Create NewIndexRecord(AltKey,PrimaryKey):
        NewIndexRecord.AltKey = NewAltKey
        NewIndexRecord.PrimaryKey = NewPrimaryKey
    If NewIndexRecord is already present in NewIndex
        Return
    Else
        {
        Store NewIndexRecord in NewIndex
        Add B-tree entry for the NewIndexRecord
        }

Return
```

- 43 -

APPENDIX 7

Pseudocode Representation of Check Duplicate Record Procedure

```
    Procedure CheckDupRecord (BaseTable, NewIndex, DupRecord)

/*  BaseTable is a database table
        NewIndex is an index file being created for the BaseTable
        DupRecord is an index record whose AltKey value is the same as
            the AltKey value of an already existing index record
    */

/* Generate alternate key value and primary key value from DupRecord */
    AltKeyValue2 = Create_AltKey( DupRecord, AltIndexColumns)
    PrimaryKeyValue2 = Create_PrimaryKey(DupRecord, PrimaryIndexColumns)

As a unitary transaction:
    {
    Access the base table record, if any, having a primary key value of
        PrimaryKeyValue2, requesting a lock on the requested record .
    If Record=BaseTable(PrimaryKeyValue2) is found in base table
        {
        /* Extract the alternate key value for that base record */
        AltKeyValueY = Record(PrimaryKeyValue2).AltKey
        If AltKeyValueY ≠ AltKeyValue2
                TransactionReturn ("DupRecord not found")
        }
    Else
            TransactionReturn ("DupRecord not found")
    }
    If TransactionReturn = "DupRecord not found"
        /* A Base Table record for DupRecord was not found, indicating that
            an index record for DupRecord is not needed. */
        {
        Return (Success)
        }

/* A base table record matching DupRecord's Primary and Alternate keys
        was found in base table.
```

- 44 -

```
         First step: Read the already existing NewIndex record whose alternate
         key value is DupRecord.AltKey.
         Next step: Check to see if a record with the primary key value found in
         this NewIndex record is still in Base Table
         */
         PrimaryKeyValue1 = NewIndex(AltKeyValue2).PrimaryKey
         As a unitary transaction:
             {
             Access the base table record, if any, having a primary key value of
                    PrimaryKeyValue1, requesting a lock on the requested record
             If record is found in base table
                 {
                 /* Extract the alternate key value for that base record */
                 AltKeyValueX = BaseTable(PrimaryKeyValue1).AltKey
                 If AltKeyValueX ≠ AltKeyValue2
                     TransactionReturn ("conflicting record not found")
                 }
             Else
                 TransactionReturn ("conflicting record not found")
             }

If TransactionReturn = "conflicting record not found"
             {
             /*  No Duplicate Record Problem because original record has been
                    deleted or altered */
             Delete NewIndex(AltKeyValue2)
             Call CreateIndexRecord (NewIndex, AltKey2, PrimaryKey2)
             Return (Success)
             }
         Else
             {
             /*  a conflicting base record was found */
             Return (Fail, "Duplicate key value found")
             }
         /* End of CheckDupRecord Procedure */
```

- 45 -

APPENDIX 8

Pseudocode Representation of "Audit Record to NewIndex" Procedure

```
    Procedure AuditRecord_to_NewIndex (AuditPtr, BaseTable, NewIndex)
        /*  BaseTable is database table
            NewIndex is index file
            AuditPtr is a pointer to an Audit Trail record
        */
        /* Ignore irrelevant Audit Record */
        If Audit Record denotes a change to a base table record that does not
            alter either the PrimaryKey or AltKey of the record
            { Ignore Audit Record }
        /* Record deleted from Base Table */
        ElseIf Audit Record denotes deletion of a base table record
            {
            Create an audit record representing deletion of the associated
                NewIndex record
            If this record exists in NewIndex (i.e., matching both the PrimaryKey
                and AltKey of the deleted base table record)
                Redo the newly created audit record against NewIndex
            }
        /* New Record Added to Base Table */
        ElseIf Audit Record denotes addition of a record to the base table
            {
            Create an audit record representing insertion of the associated
                NewIndex record
            If UniqueIndexFlag
                {
                AltKey1 = Create_AltKey( Inserted Record, AltIndexColumns)
                Search NewIndex for an index record with
                    NewIndex.AltKey equal to AltKey1
                If a match is found
                    {
                    Call CheckDupRecord (BaseTable, NewIndex, Inserted
                        Record)
```

- 46 -

```
            If ReturnCode = "fail"
                Abort CreateIndex Procedure
            }
        Else
            Redo the newly created audit record against NewIndex
        }
    Else    / * UniqueIndexFlag is False */
        Redo the newly created audit record against NewIndex
    }

/* PrimaryKey and/or AltKey in Base Table record was altered */
    ElseIf audit record denotes alteration of a base table record
    {
        Create a first audit record representing deletion of the NewIndex
            record associated with the base table record's old value
        If this record exists in NewIndex (i.e., matching both the PrimaryKey
            and AltKey of the base table record's old value)
            Redo the first newly created audit record against NewIndex Create a second audit record representing insertion of the NewIndex
            record associated with the base table record's new (altered)
            value
        If UniqueIndexFlag
        {
            AltKey1 = Create_AltKey( Altered Record, AltIndexColumns)
            Search NewIndex for an index record with
                NewIndex.AltKey equal to AltKey1
            If a match is found
            {
                Call CheckDupRecord (BaseTable, NewIndex, Altered
                    Record)
                If ReturnCode = "fail"
                    Abort CreateIndex Procedure
            }
            Else
                Redo the second newly created audit record against
                    NewIndex
        }
        Else    / * UniqueIndexFlag is False */
```

- 47 -

```
        Redo the second newly created audit record against NewIndex
    } /* end of processing for "table alteration" audit record
Return
```

What is claimed is:

1. A computer system for storing and providing user access to data in stored database objects, comprising:

memory for storing said database objects, wherein said memory resides in a plurality of interconnected computer nodes;

a transaction manager, coupled to said memory, for managing computational transactions that add, delete and alter data stored in said database objects; said transaction manager including audit trail generation instructions for generating an audit trail and storing said audit trail in said memory, said audit trail including audit records, at least a subset of said audit records each denoting an event selected from the set consisting essentially of addition, deletion and alteration of specified data in a specified one of said database objects;

a restructuring procedure, coupled to said memory, for restructuring a specified one of said database objects, said restructuring procedure, including:

first phase instructions for accessing data in said first object and storing corresponding data in a second object while allowing continued performance of computational transactions against said first object;

second phase instructions, for execution after said first phase instructions, for accessing said audit records in said audit trail created by said transaction manager during execution of said first phase instructions and thereafter until execution of said second phase instructions is completed; said second phase instructions updating said data stored in said second object by redoing with respect to said second object each event denoted by said accessed audit trail records; and third phase instructions, for execution after said second phase instructions, for obtaining a lock on said first object so as to prevent continued performance of computational transactions against said first object, and for then accessing audit records in said audit trail created by said transaction manager after execution of said second phase instructions; said third phase instructions updating said data in said second object by redoing with respect to said second object each event denoted by said accessed audit trail records.

2. The computer system of claim 1, said database objects including database tables and database indexes, each database table having a plurality of columns, a plurality of records having primary key values based on a first specified subset of said columns, and a primary key index based on said primary key values;

said restructuring procedure comprising a create index procedure for creating an alternate key index having a unique alternate key value for each record;

said first object comprising one of said database tables and said second object comprising an alternate key index generated by said create index procedure;

said first phase instructions including instructions for accessing said records in said one database table and instructions for generating and storing a corresponding index record in said alternate key index, each record in said alternate key index including said primary key value for said corresponding database table record and an alternate key value based on a second specified subset of said columns;

said second phase and third phase instructions including instructions for deleting an index record in said alternate key index when one of said accessed audit records indicates an event making said alternate key index record invalid, and instructions for adding index records to said alternate key index when said accessed audit records indicate events that add new database records and events that alter any field of an existing database record corresponding to any column in said first and second specified subsets of columns; and said generating and storing instructions in said first phase instructions, and said adding index records instructions in said second phase and third phase instructions including instructions for determining whether two records in said one database table have identical alternate key index values and for aborting said create index procedure when two such records are found.

3. A computer system for storing and providing user access to data in stored databases, comprising:

memory for storing said databases, said databases including database tables, each database table having a plurality of columns, and a primary key index based on a specified subset of said columns; wherein said memory resides in a plurality of interconnected computer nodes;

at least a subset of said database tables each including a plurality of partitions, each partition storing records having primary key values in a primary key range distinct from all others of said plurality of partitions; each partition stored as a separate data structure in said memory;

a transaction manager, coupled to said memory, for managing computational transactions that add, delete and alter records in said database tables; said transaction manager including audit trail generation instructions for generating an audit trail and storing said audit trail in said memory, said audit trail including audit entries, each audit entry denoting a database table record event selected from the set consisting essentially of addition, deletion and alteration of a specified database table record in a specified one of said database tables;

a move partition procedure, coupled to said memory, for moving any specified one of said partitions for one of said database tables having a plurality of partitions from a first memory location to a second memory location; said move partition procedure, including:

first phase instructions for creating a new partition at said second memory location and for copying all records of said specified partition into said new partition, using read only access to said records of said specified partition while performing said copying;

second phase instructions, for execution after said first phase instructions, for accessing audit records in said audit trail created by said transaction manager during execution of said first phase instructions and thereafter until execution of said second phase instructions is completed; said second phase instructions updating said records in said new partition so as to redo each database table record event denoted by said accessed audit trail records; and third phase instructions, for execution after said second phase instructions, for obtaining a lock on said one database table, then accessing audit records in said audit trail created by said transaction manager after execution of said second phase instructions; said third phase instructions updating said records in said new partition so as to redo each database table record event denoted by said accessed audit trail records;

said third phase instructions further including instructions for releasing said lock on said one database table.

4. The computer system of claim 3, each database table having an associated schema denoting information about said table's columns, said third phase instructions including instructions for updating said schema information for said one database table to indicate said new partition's memory location.

5. A method of storing and providing user access to data in stored database objects, comprising the steps of:

storing said database objects in memory, wherein said memory resides in a plurality of interconnected computer nodes;

while performing computational transactions that add, delete and alter data stored in said database objects, generating an audit trail and storing said audit trail in said memory, said audit trail including audit records, at least a subset of said audit records each denoting an event selected from the set consisting essentially of addition, deletion and alteration of specified data in a specified one of said database objects;

restructuring a specified one of said database objects, said restructuring step including:

in a first phase, accessing data in said first object and storing corresponding data in a second object while allowing continued performance of computational transactions against said first object;

in a second phase, accessing said audit records in said audit trail created during said first phase and thereafter until performance of said second phase is completed, and updating said data stored in said second object by redoing with respect to said second object each event denoted by said accessed audit trail records; and in a third phase, obtaining a lock on said first object so as to prevent continued performance of computational transactions against said first object, and then accessing audit records in said audit trail generated after said second phase and updating said data in said second object by redoing with respect to said second object each event denoted by said accessed audit trail records.

6. The method of claim 5, said database objects including database tables and database indexes, each database table having a plurality of columns, a plurality of records having primary key values based on a first specified subset of said columns, and a primary key index based on said primary key values;

said restructuring step comprising a step for creating an alternate key index having a unique alternate key value for each record;

said first object comprising one of said database tables and said second object comprising said alternate key index generated by said create index procedure;

said restructuring step including:

in said first phase, accessing said records in said one database table and generating and storing a corresponding index record in said alternate key index, each record in said alternate key index including said primary key value for said corresponding database table record and an alternate key value based on a second specified subset of said columns;

in said second phase and said third phase instructions, deleting an index record in said alternate key index when one of said accessed audit records indicates an event making said alternate key index record invalid, and adding index records to said alternate key index when said accessed audit records indicate events that add new database records and events that alter any field of an existing database record corresponding to any column in said first and second specified subsets of columns; and determining whether two records in said one database table have identical alternate key index values and aborting said restructuring step when two such records are found.

7. A method of storing and providing user access to data in stored databases, comprising the steps of:

storing said databases in memory, said databases including database tables, each database table having a plurality of columns, and a primary key index based on a specified subset of said columns; wherein said memory resides in a plurality of interconnected computer nodes;

at least a subset of said database tables each including a plurality of partitions, each partition storing records having primary key values in a primary key range distinct from all others of said plurality of partitions; each partition stored as a separate data structure in said memory;

while performing computational transactions that add, delete and alter records in said database tables, generating an audit trail and storing said audit trail in said memory, said audit trail including audit entries, each audit entry denoting a database table record event selected from the set consisting essentially of addition, deletion and alteration of a specified database table record in a specified one of said database tables;

moving any specified one of said partitions for one of said database tables having a plurality of partitions from a first memory location to a second memory location; said moving step including:

in a first phase, creating a new partition at said second memory location and copying all records of said specified partition into said new partition, using read only access to said records of said specified partition while performing said copying;

in a second phase, accessing audit records in said audit trail created execution of said first phase and thereafter until performance of said second phase is completed, and updating said records in said new partition so as to redo each database table record event denoted by said accessed audit trail records; and in a third phase, obtaining a lock on said one database table, then accessing audit records in said audit trail created after completion of said second phase, and updating said records in said new partition so as to redo each database table record event denoted by said accessed audit trail records; said third phase further including releasing said lock on said one database table.

8. The method of claim 7, each database table having an associated schema denoting information about said table's columns, said third phase of said moving step including updating said schema information for said one database table to indicate said new partition's memory location.

9. A computer-readable memory configured to direct a computer system to store and provide user access to data in stored database objects, comprising:

a transaction manager for managing computational transactions that add, delete and alter data stored in said database objects; said transaction manager including audit trail generation instructions for generating an audit trail, said audit trail including audit records, at least a subset of said audit records each denoting an event selected from the set consisting essentially of addition, deletion and alteration of specified data in a specified one of said database objects;

a restructuring procedure for restructuring a specified one of said database objects, said restructuring procedure, including:

first phase instructions for accessing data in said first object and storing corresponding data in a second object while allowing continued performance of computational transactions against said first object;

second phase instructions, for execution after said first phase instructions, for accessing said audit records in said audit trail created by said transaction manager during execution of said first phase instructions and thereafter until execution of said second phase instructions is completed; said second phase instructions updating said data stored in said second object by redoing with respect to said second object each event denoted by said accessed audit trail records; and third phase instructions, for execution after said second phase instructions, for obtaining a lock on said first object so as to prevent continued performance of computational transactions against said first object, and for then accessing audit records in said audit trail created by said transaction manager after execution of said second phase instructions; said third phase instructions updating said data in said second object by redoing with respect to said second object each event denoted by said accessed audit trail records.

10. The computer-readable memory of claim 9, said database objects including database tables and database indexes, each database table having a plurality of columns, a plurality of records having primary key values based on a first specified subset of said columns, and a primary key index based on said primary key values;

said restructuring procedure comprising a create index procedure for creating an alternate key index having a unique alternate key value for each record;

said first object comprising one of said database tables and said second object comprising an alternate key index generated by said create index procedure;

said first phase instructions including instructions for accessing said records in said one database table and instructions for generating and storing a corresponding index record in said alternate key index, each record in said alternate key index including said primary key value for said corresponding database table record and an alternate key value based on a second specified subset of said columns;

said second phase and third phase instructions including instructions for deleting an index record in said alternate key index when one of said accessed audit records indicates an event making said alternate key index record invalid, and instructions for adding index records to said alternate key index when said accessed audit records indicate events that add new database records and events that alter any field of an existing database record corresponding to any column in said first and second specified subsets of columns; and said generating and storing instructions in said first phase instructions, and said adding index records instructions in said second phase and third phase instructions including instructions for determining whether two records in said one database table have identical alternate key index values and for aborting said create index procedure when two such records are found.

11. A computer-readable memory configured to direct a computer system to store and provide user access to data in stored databases, said databases including database tables, each database table having a plurality of columns, and a primary key index based on a specified subset of said columns; at least a subset of said database tables each including a plurality of partitions, each partition storing records having primary key values in a primary key range distinct from all others of said plurality of partitions; each partition stored as a separate data structure in memory associated with said computer system; said computer-readable memory comprising:

a transaction manager for managing computational transactions that add, delete and alter records in said database tables; said transaction manager including audit trail generation instructions for generating an audit trail and storing said audit trail in said memory, said audit trail including audit entries, each audit entry denoting a database table record event selected from the set consisting essentially of addition, deletion and alteration of a specified database table record in a specified one of said database tables;

a move partition procedure, coupled to said memory, for moving any specified one of said partitions for one of said database tables having a plurality of partitions from a first memory location to a second memory location; said move partition procedure, including:

first phase instructions for creating a new partition at said second memory location and for copying all records of said specified partition into said new partition, using read only access to said records of said specified partition while performing said copying;

second phase instructions, for execution after said first phase instructions, for accessing audit records in said audit trail created by said transaction manager during execution of said first phase instructions and thereafter until execution of said second phase instructions is completed; said second phase instructions updating said records in said new partition so as to redo each database table record event denoted by said accessed audit trail records; and third phase instructions, for execution after said second phase instructions, for obtaining a lock on said one database table, then accessing audit records in said audit trail created by said transaction manager after execution of said second phase instructions; said third phase instructions updating said records in said new partition so as to redo each database table record event denoted by said accessed audit trail records; said third phase instructions further including instructions for releasing said lock on said one database table.

12. The computer-readable memory of claim 11, each database table having an associated schema denoting information about said table's columns, said third phase instructions including instructions for updating said schema information for said one database table to indicate said new partition's memory location.

* * * * *